June 5, 1945.  A. VENDITTY  2,377,467

UNIVERSAL JOINT

Filed July 27, 1942   2 Sheets-Sheet 1

Inventor
ANTHONY VENDITTY.

June 5, 1945.  A. VENDITTY  2,377,467
UNIVERSAL JOINT
Filed July 27, 1942  2 Sheets-Sheet 2
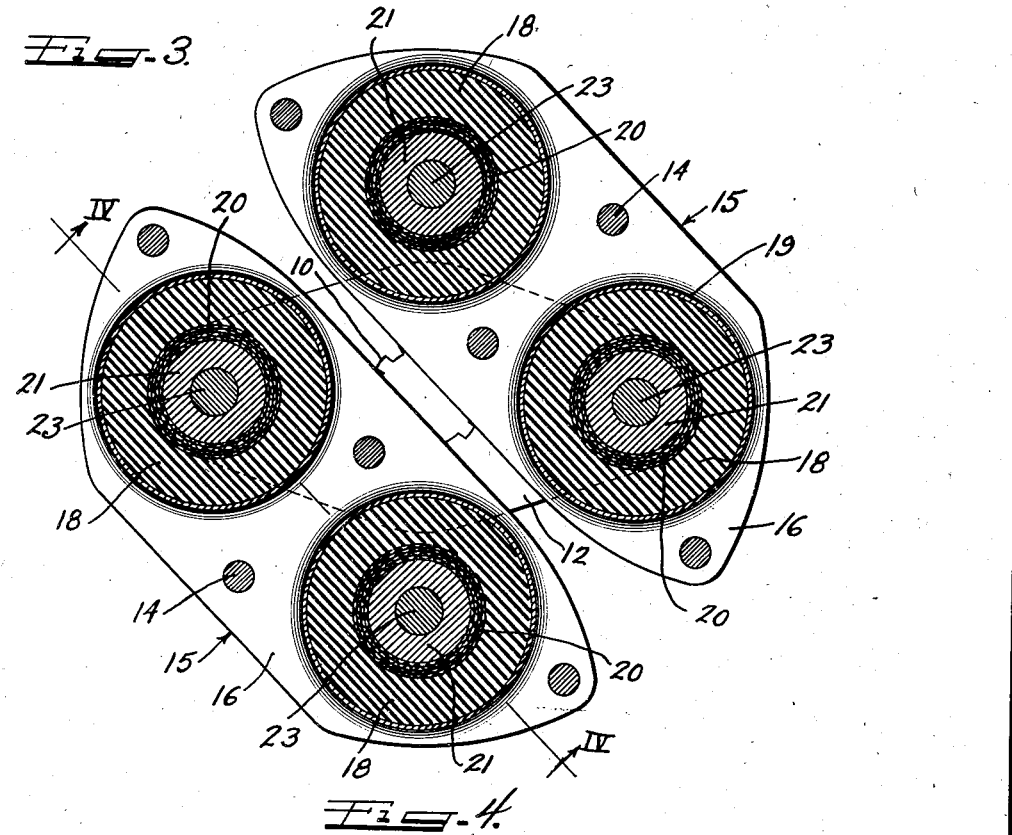
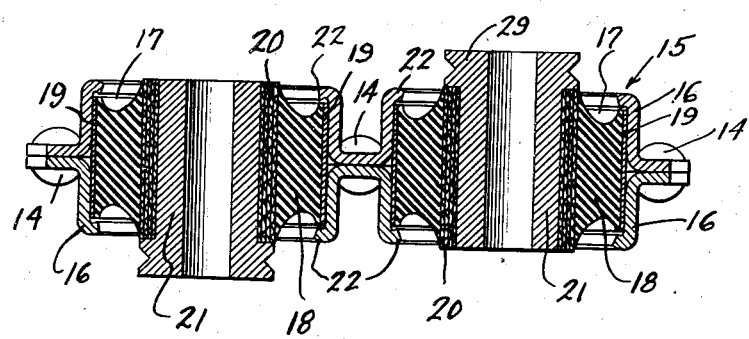
Inventor
ANTHONY VENDITTY.
by Charles Still
Attys.

Patented June 5, 1945

2,377,467

UNITED STATES PATENT OFFICE 2,377,467

UNIVERSAL JOINT

Anthony Venditty, Detroit, Mich., assignor to Thompson Products, Inc., a corporation of Ohio Application July 27, 1942, Serial No. 452,401

2 Claims. (Cl. 64—11)

This invention relates to couplings and, more particularly, to an improved universal joint which particularly lends itself to economical manufacture on a large production scale.

An object of this invention is to provide in a universal joint of the type having opposed coupling elements, a torque transmitting member for connecting the coupling members, the body of which may be economically manufactured from interchangeable metal stampings.

Another object of this invention is to provide a coupling having a torque transmitting member providing flexible joints between the elements to be coupled and each of which joints includes a novelly retained rubber trunnion block.

A further object of the invention is to simplify and cheapen the manufacture of torque transmitting members for use in coupling joints without detracting from the longevity and wearing characteristics of the torque transmitting members.

Another object of the invention is to provide a universal joint having increased angulation capacity.

In accordance with the general features of this invention, there is provided in a coupling having opposed coupling elements a torque transmitting member for disposition between and for connecting the coupling elements together and which member comprises a metallic body made of a plurality of interchangeable metallic stampings joined together and each of which comprises a half of the body; the body having a plurality of recesses in each of which is retained a block of rubber having a central stud bearing at right angles to the plane of the body.

Another feature of the invention relates to the manner in which the rubber block is retained in position in the stampings comprising the body of the torque transmitting member.

An important feature of this invention is the provision of a plurality of separate torque transmitting members between the driving and driven parts to increase the range of angular displacement of the parts. The provision of these separate members will accommodate approximately twice the angle of displacement between the parts that can be accommodated by a four-block joint with a solid round casing or body.

Still another feature of the invention relates to the joining of the stampings of the body of the torque transmitting member together in a plane at right angles to that of the stud bearings.

Other objects and features of this invention will more fully appear from the following detailed description taken in connection with the accompanying drawings, which illustrate a single embodiment thereof, and in which:

Figure 3 is a horizontal cross-sectional view taken on the line III—III of Figure 2 looking downwardly; and Figure 4 is a cross-sectional view taken on the line IV—IV of Figure 3 looking in the direction indicated by the arrows and showing the construction of a torque-transmitting member with the studs removed therefrom.

As shown on the drawings:

Figure 1:
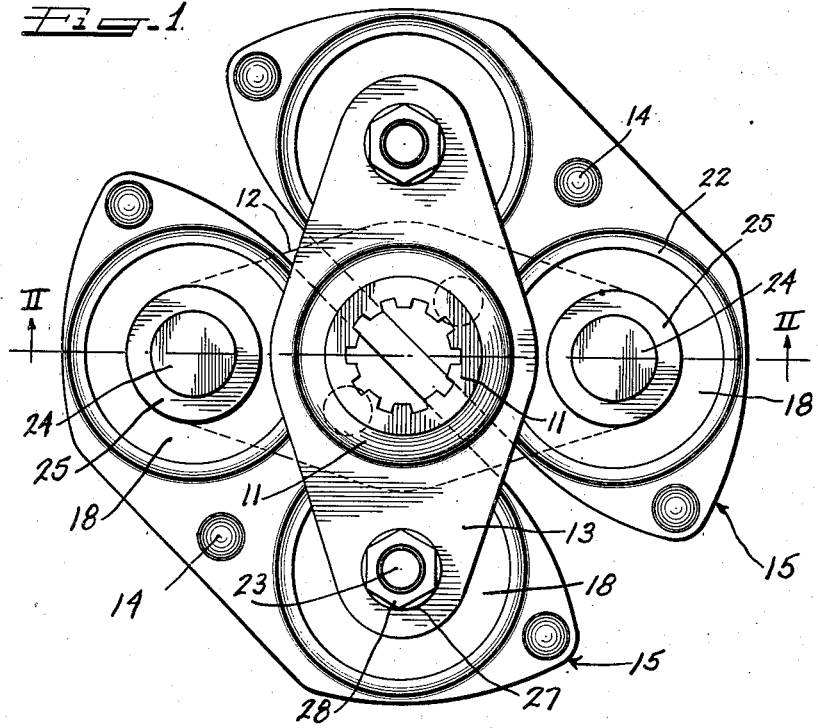
Figure 1 is a plan view of a joint embodying the features of my invention.
Figure 2:
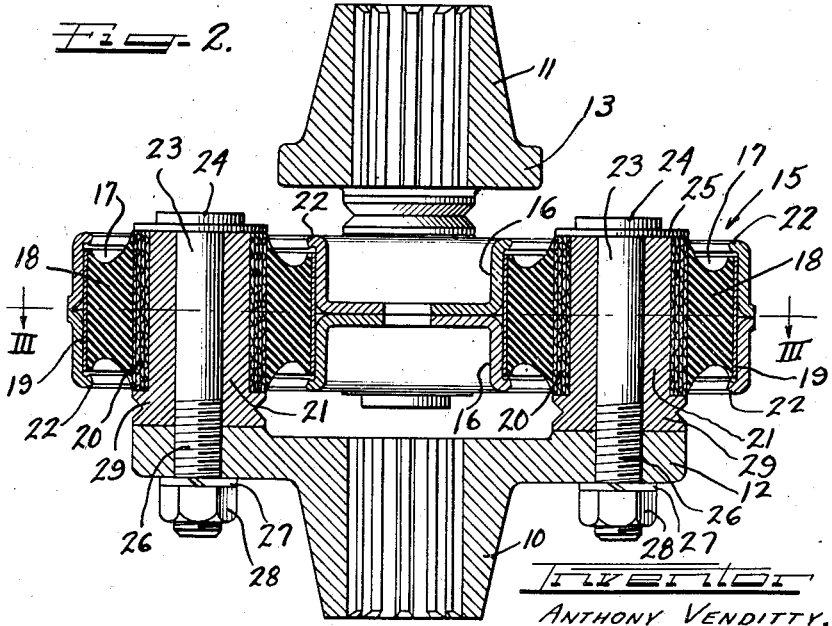
Figure 2 is a cross-sectional view taken on the line II—II of Figure 1 looking upwardly.

The reference characters 10 and 11 designate two axially aligned but spaced coupling members, each of which is splined to receive in the usual way the shafts to be coupled together. The coupling member 10 has a double-ended flange 12 for cooperation with diametrically opposed studs, and the coupling member 11 has a double-ended flange 13 for cooperation with diametrically opposite studs and which flange 13 is turned 90° relative to the flange 12, as shown in Figure 1. This arrangement is such that there is provided four flexible joints embodied in a pair of torque transmitting members 15—15, which interconnect the flanges of the two coupling members 10 and 11.

As shown in Figure 1, the torque transmitting members 15—15 are disposed in parallel arrangement, and inasmuch as they are interchangeable and are identical in construction, a description of one will, of course, suffice for both. Since these members are spaced apart so as not to interfere with each other, the joint has a large range of angular movement. Before proceeding with a description of the details of each of the torque transmitting members, it should be noted that these members take the place of the well known spider or cruciform type of connection used in joints heretofore.

Each torque transmitting member 15 comprises a pair of identical metal stampings 16—16, which are interchangeable and which are suitably secured together as by means of rivets 14. These stampings may be fabricated on a large scale production basis from suitable sheet metal stock and, since they are identical, assembly of them is greatly facilitated.

In assembling each of the members 15, rubber blocks 18 are positioned in circular recesses 17 formed in the ends of each member. In Figures 3 and 4 it will be noted that the rubber blocks are slightly spaced from each other and are positioned in the recesses 17 at opposite ends of the member. Also the stampings 16 of the member are secured by rivets at the ends of the member as well as between the recesses accommodating the rubber blocks. The recesses are provided in the blanks 16 by the formation of upset annular walls provided during the stamping of the metal going into each half of the member 16.

Each of the rubber blocks 18 is of an annular or ring-like construction and is preferably made of a hard rubber, such as vulcanized rubber. Also each rubber block is tightly fitted inside of a steel bushing or liner 19, which confines the rubber at right angles to the direction of the torque applied thereto. The inner periphery of each rubber block has embedded in it or attached thereto a wire mesh liner 20, which defines a hole in which is received a metal stud bearing or sleeve 21. These bearings or sleeves 21, as shown in Figure 4, are at right angles to the plane of the joint between the two stampings 16 comprising the body of the torque transmitting member 15.

In order to aid in the retention of the rubber blocks in the member 15, edge portions 22 of the blanks about the recesses 17 are pressed or spun over the extremities of the metal liners 19.

Detachably positioned within the sleeves or bearings 21 are trunnion studs 23, each of which has an enlarged head 24 engaging against a washer 25, which overlaps an end of the wire mesh liner 20 to aid in the retention of the rubber block inside of the recess of the member 15.

The stud 23 also has a threaded end 26, which extends through a hole in one of the coupling flanges, and this threaded portion 26 has screwed upon it a retaining nut 28 cooperable with a spring washer 27 bearing against an outer surface of the coupling flange 12—13.

As noted before, one end of the rubber block assembly is held in the member 15 partly by means of the washer 25. The other end of the rubber block assembly is retained in its place by reason of an enlarged or shouldered portion 29 formed on the bearing or sleeve 21. Thus the rubber block is tightly retained in position at its inner periphery by the stud 23 and the bearing 21, and the outer periphery of the rubber block is retained in place by the turned edge 22.

From Figure 1 it will be perceived that each coupling flange is connected by one flexible joint to one of the torque transmitting members 15 and is connected at its other end to the other torque transmitting member. This arrangement is such that the four rubber blocks of the two torque transmitting members 15 are alternately connected to the two coupling flanges 12 and 13. By reason of the fact that the rubber blocks and the stud assemblies are disposed parallel to the axis of the coupling, the torque load is transmitted through the rubber blocks at right angles to the studs 23 and their cooperating bearings or trunnions 21. Furthermore, inasmuch as the halves of each of the members 15 are joined in a plane at right angles to the axes of the bearings or sleeves 21, the rubber blocks are properly positioned to respond to the pressure of the torque load applied thereto and any displacement of the rubber occurs endwise of the recesses 17 or, in other words, in the direction of the axis of the coupling.

It will, of course, be understood that various details of construction may be varied through a wide range without departing from the principles of this invention and it is, therefore, not the purpose to limit the patent granted hereon otherwise than necessitated by the scope of the appended claims.

I claim as follows:

1. In a coupling, opposed coupling elements, each of the flange type and the flange on one coupling being radially offset from the other so that said flanges are at right angles to each other and present four equidistantly spaced ends, a stud anchored to each of said ends, and a pair of spaced parallel torque transmitting members interposed between the flanges of said coupling elements each having a pair of diametrically opposed stud bearings, one stud bearing of each pair receiving a stud on one flange and the other stud bearing of each pair receiving a stud on the other flange whereby said members are mounted at 45° angles relative to the flanges, said members each comprising a pair of metal stampings, each pair of stampings comprising two duplicate halves joined together on a plane at right angles to the axes of the two oppositely disposed bearings of each member and at right angles to the axis of the coupling.

2. In a coupling, crossed spaced opposed coupling flanges each having an aligned central shaft receiving hub, said flanges providing four equally spaced ends, a stud anchored to each end and projecting into the space between the flanges, a pair of spaced parallel torque-transmitting members between said flanges, and rubber bushed stud bearings mounted in the ends of said torque-transmitting members receiving said studs with each flange having one stud seated in a bearing of one member and the other stud seated in a bearing of the other member to carry the members in diagonal relation relative to the crossed flanges.

ANTHONY VENDITTY.